Sept. 30, 1941.  W. M. GOLDSMITH  2,257,296
LATH MOUNTING
Filed Feb. 9, 1939  2 Sheets-Sheet 2
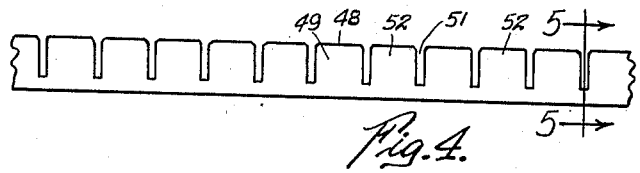
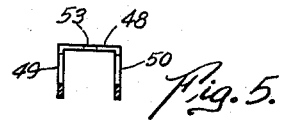
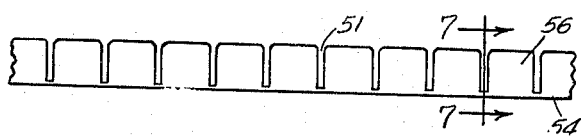
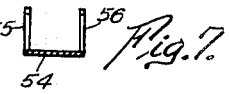
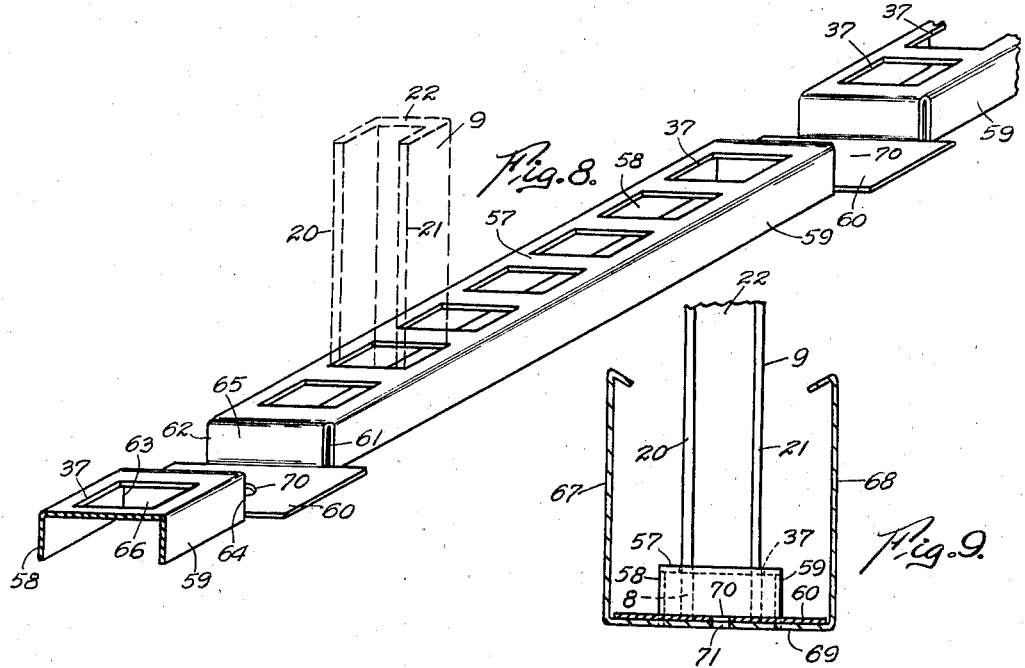
INVENTOR
William M. Goldsmith
BY Frank Zugelter
ATTORNEY Patented Sept. 30, 1941

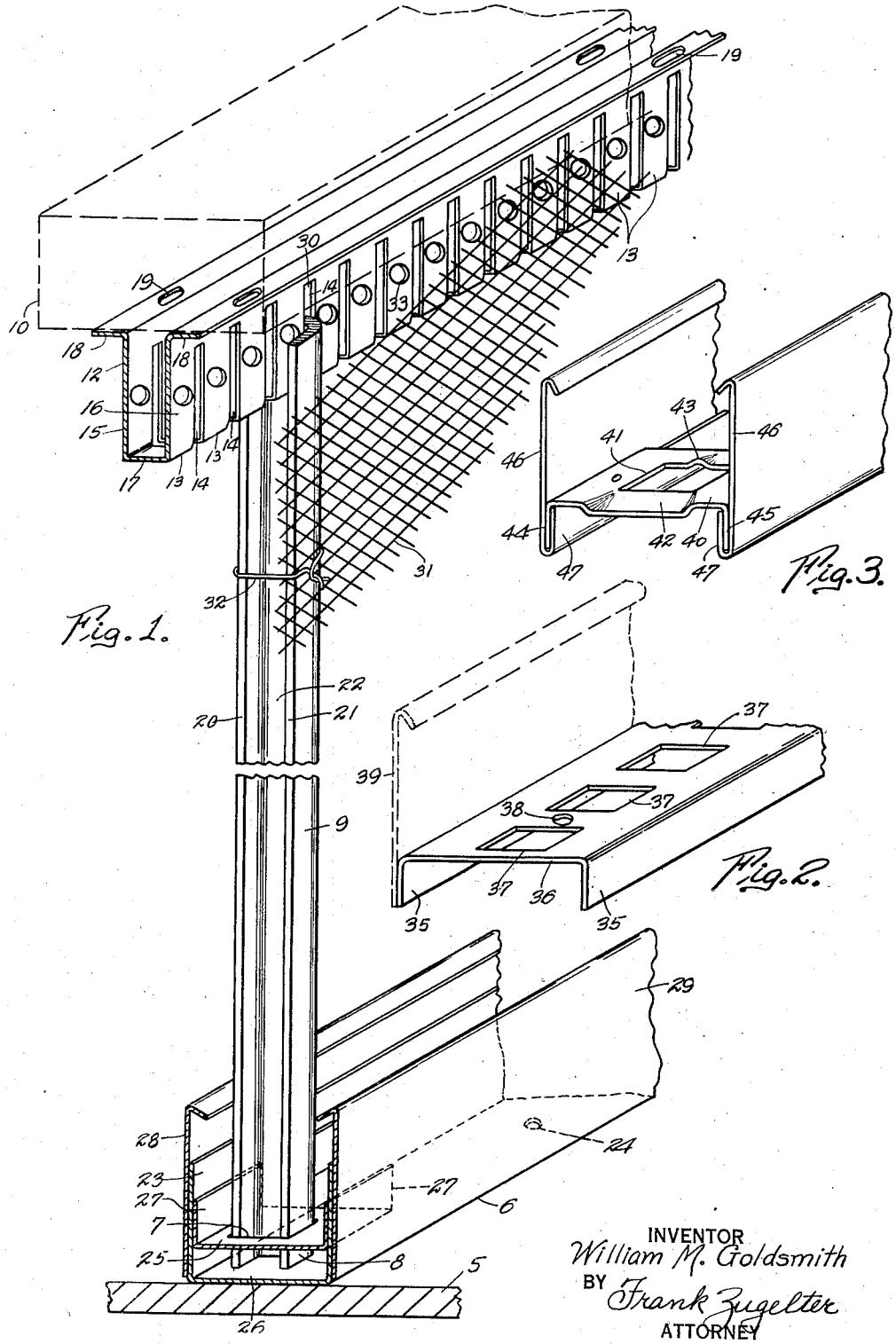

2,257,296

UNITED STATES PATENT OFFICE 2,257,296

LATH MOUNTING

William M. Goldsmith, Cincinnati, Ohio

Application February 9, 1939, Serial No. 255,437

11 Claims. (Cl. 72—46)

This invention relates to improvements in lath mountings for the walls or other partition structures of buildings and the like.

An object of the invention is to provide means facilitating the erection of walls or other partitions, with a substantial saving of time and expense.

Another object is to provide an improved combination of means in a wall or partition, whereby the studs or upright lath support members may be used as they come from the mill, in the form of conventional mill-run channel irons, thereby obviating factory operations upon the studs or support members, and dispensing with multiple shipping and handling between the mill, the factory, and the job.

Another object of the invention is to provide an improved simple and inexpensive, yet durable means, for incorporating metal lath sheeting or like plaster supporting means in a wall or partition undergoing construction, which improved means furnishes a high degree of lateral support for the plaster or other principal constituent of the wall or partition surfaces.

The foregoing and other objects are attained by the means described herein and disclosed in the accompanying drawings, in which:

Fig. 1 is a vertical cross-sectional view of a wall or partition structure embodying the invention, the view being developed in perspective.

Fig. 2 is a fragmental perspective view of a stud socket member, which is a modification of the stud socket member shown in Fig. 1.

Fig. 3 is a fragmental perspective view of a second modified form of stud socket member, which may be employed in the combination illustrated in Fig. 1.

Fig. 4 is a side elevational view of a longitudinal stud socket member, showing a modification of Fig. 2, and used along the floor line of a wall or partition.

Fig. 5 is a cross-sectional view taken on line 5—5 of Fig. 4.

Fig. 6 is a view similar to Fig. 4, and showing a modification of the stud socket member therein disclosed.

Fig. 7 is a cross-sectional view taken on line 7—7 of Fig. 6.

Fig. 8 is an additional modification, and shows in perspective an improved form of stud socket member for disposition along the floor line.

Fig. 9 is a transverse cross-sectional view showing a stud socket member of the Fig. 8 type as applied in a wall or partition structure which includes a base-board.

It has been common practice in the erection of walls or partitions, to furnish means along the floor and ceiling of a room, for positioning the studs or lath supporting members in upright position so as to provide the necessary skeletal framework for the wall or partition. In most instances, the practice has been to achieve a desired rigidity, durability, and simplicity, by the employment of rather elaborate means which required vertical stud members of special design and configuration. In certain of the known constructions, the stud members were provided with notches, slits, and various types of abutment elements which were believed necessary for the accomplishment of the desired results in the erection of the wall or partition. Because of the fact that the studs heretofore were necessarily subjected to machine operations or refinements necessarily incorporated in a factory other than the mill at which the studs were initially fabricated, considerable reshipment and rehandling of the stud members were unavoidable. The present invention has as one of its objects the provision of means in the wall or partition structure, whereby stud members as they come from the mill in the form of mill-run standard stock, may be employed effectively in the wall or partition structure without the requirement that the stud members be sent to a factory prior to delivery thereof to the job. In other words, stud members cut to an approximate desired length may be shipped direct from the mill to the job, without the intervention of a factory operation that would require reshipment and rehandling.

With reference to the accompanying drawings, the character 5 indicates the floor of a room or other compartment, upon which a wall or partition is to be erected. To the floor may be nailed, or otherwise suitably secured, a pocket, or lower wall support means 6, which preferably includes a socket or aperture 7 for the reception of the lower end 8 of a stud or upright lath support member 9. The lower wall support means 6 may be of any suitable character so long as it includes a socket elevated slightly above the floor 5, for reception of the lower end of the stud as shown in Fig. 1. Suggestions for different forms of lower wall support means or pockets are illustrated in Figs. 2 to 9 of the drawings. It is to be understood that the pocket for receiving the lower end of the elongated studding member is not necessarily limited to the specific means or forms shown herein, it being sufficient that such means are adapted to receive the lower end of the studding by way of a rectilinear substantially vertical movement of the studding member, first upwardly for bringing the upper end of the channel into cooperative relationship with the head blocks, such as 13, and then moving the lower end of the studding downwardly to lodge said lower end of the studding in the pocket at the floor or in such relationship to the means provided at the floor, that the lower end of the studding cannot be displaced in any direction substantially perpendicular to the length of the studding member.

At or near the ceiling of the room or compartment, an upper wall support member 10 may be furnished, and in the present embodiment this member is illustrated as a horizontal timber or the like extending in parallelism with the member 6 at the floor. To the lower face of the member 10, there is nailed or otherwise secured an overhead stud holder 12 which may be in the form of a channel member, preferably fabricated from sheet metal, and comprising a series of spaced head blocks 13 separated by substantially vertical slits, notches or ways 14. It should be noted that the overhead stud holder may be formed conveniently from a long strip of sheet metal bent into substantial U-shape to provide opposed legs 15 and 16, a connecting portion 17, and mounting flanges 18 suitably apertured as at 19 for the reception of nails or the like to be driven through the flanges and into the lower surface of the upper wall support member 10.

The spaced head blocks 13 are so proportioned that the distance between the legs 15 and 16 is slightly less than the space between the legs 20 and 21 of the channel-shaped stud 9. The spaces 14 between the head blocks of the overhead stud holder, are of sufficient width to receive, without a substantial amount of play, the web 22 of the channel-iron stud. From the foregoing, it should readily be evident that a channel-iron stud may be applied to the overhead stud holder by inserting the web of the stud within the slots or ways 14, while the legs 20 and 21 of the stud embrace a head block, thereby to obviate all possibility of shiftability of the upper end of the stud relative to the overhead stud holder 12. It is considered noteworthy that neither end of the channel-iron stud requires any factory operation to adapt it for proper usage in connection with the overhead stud holder or with the floor socket member. All that is required to adapt the stud for immediate usage in the wall or partition, is to cut it to an approximate desired length.

With reference now to the lower wall support means 6 of Fig. 1, such support means may be formed of a channel member 23 having spaced apertures provided at intervals along its length, for the reception of nails or other means for fastening the channel to the floor, and intermediate the upright sides of said channel member 23 there may be welded or otherwise suitably fixed, a stud socket member 25. The stud socket member may be apertured as at 7 so as to permit insertion of the lower end of the stud 9, and as previously stated, the aperture should be disposed at a slight elevation above the floor or above the base 26 of the channel 23. The vertical leg 27 of the apertured socket member 25 may be fixed to the floor member 23 in any acceptable manner. If desired, the floor member may be furnished with opposed upstanding walls or strips of metal 28 and 29, to provide base-boards along the foot of the wall or partition.

It is important to note that the length of the stud 9 shall be slightly less than the distance between the socket member 25 and the base 30 of a slot or way 14 located directly above the socket member, so that the stud may be erected by inserting its upper end into the slot or way until it reaches the base thereof, whereupon the extreme lower end of the stud may be positioned over, and dropped into the aperture 7 of the socket member 25. That is to say, the stud 9 is reciprocable vertically within a slot or way such as 14, for disposition of the lower end of the stud either within or without the stud socket aperture 7. The aperture preferably is made rectangular so as to avoid rotation or twisting of the stud once it has been placed in position to support a sheet or sheets of plaster-supporting lath, as indicated by the character 31.

It is to be understood that the lath 31 is illustrated conventionally only, and that the nature or the type of lath to be wired or otherwise fastened to the studs and to the overhead stud holder 12, is immaterial to the present invention. As will be understood, the lath may be tied in place at intervals along the length of the studs, as at 32, and it may be similarly wired to the overhead stud holder in an obvious manner. The various slots or ways 14, and the series of apertures 33 that may be formed in the sides of the head blocks 13, furnish effective means for bonding the paster securely in the region of the top of the wall or partition, if plaster be used in the construction of the wall or partition. It is to be understood that sheeting of a preformed or sectional character, as well as other types of wall material, could be substituted for plaster in the wall structure herein disclosed.

As stated previously herein, the stud socket-forming means at the base of the wall or partition may be of any suitable formation. For example, as in Fig. 2, it may be simply an inverted U-shaped pressed metal channel having legs 35 and a web 36 apertured along its length as at 37, to furnish sockets for reception of the lower ends of the stud members. In this character of construction, any one of the apertures 37 may be utilized for positioning the lower end of the stud, so long as such aperture is located at least approximately directly beneath a given slot or way 14 selected for anchorage of the upper end of the stud. At intervals along the length of the web 36, apertures 38 for the reception of nails or other fasteners may be provided as a means of fixing the socket member to the floor. The character 39 indicates how a base-board might be applied, in accordance with the teaching of Fig. 1.

In Fig. 3 is illustrated a modified form of lower wall support, wherein the socket member 40 has an aperture 41 bounded at opposite sides by an incline 42 and a stop 43 which cooperate in guiding the lower end of a stud quickly into the socket aperture 41. The legs 44 and 45 of member 40 may be fixed to a pair of base-boards 46 in any acceptable manner, for example, by clinching them within a bead or flange pocket 47 formed along the base-board edges. The structure may be secured to a floor in the manner of Fig. 2, or otherwise, as may be desired.

Inasmuch as the slots or ways 14 of the overhead stud holder of Fig. 1 have their bases 30 located at some little distance from the flanges 18 which serve to mount the stud holder upon a support 10, the head blocks 13 are rendered considerably resistant to bending and deformation laterally, with the result that the wall is adequately supported, with its strength augmented by reason of the fact that the stud ends are solid and therefore unweakened by slots or notches. The studs are securely held against movement in all lateral directions, and the strength of the stud legs are imparted to the head blocks by reason of the embracing function thereof. The advantage that the studs require no alteration from their original mill-run characteristics, is of considerable importance in that the studs cut to length can be delivered to the job directly from the mill, without undergoing one or more factory operations and the expense of re-handling and re-shipping incidental thereto.

The same advantages are attainable by using in combination with the overhead wall support structure of Fig. 1, any of the lower stud supporting means disclosed in Figs. 4 to 9 inclusive. In Figs. 4 and 5, the lower stud supporting means comprises an inverted U-channel having an elevated web portion 48 and a pair of legs 49 and 50 depending therefrom. This device may be formed in long sections adapted to rest upon the floor directly beneath an overhead support such as Fig. 1 shows, and at intervals along its length the channel is slitted or notched transversely to provide the series of ways or notches 51. The bases of the notches preferably extend a substantial distance toward the free ends of legs 49 and 50, so that the longitudinal section may readily be cut to a desired length by merely snipping, with a pair of pliers or a shear or the like, the metal which remains between the notched bases and the lower edges of the legs. The slots are of such width as to accommodate the thickness of a stud web such as 22, and the outside dimension of the width of the channel member, from one leg to the other, approximates the distance between the legs 20 and 21 of a lath upright or stud. The adjacent upstanding blocks 52 thereby formed will be embraced by the legs of any stud seated within an adjacent notch or way 51. At intervals along the length of the channel member, apertures 53 may be provided for the reception of a nail or other fastening means capable of attaching the latch support to a floor.

In accordance with the disclosure of Figs. 6 and 7, the lower stud support member comprises a length of sheet metal bent into U-channel formation, providing a web base 54 and upstanding legs 55 and 56. In this modification, the ways or slots 51 begin at the free edges of the legs and extend downwardly toward or to the base 54. The slots and the body of the stud support member of Figs. 6 and 7 bear the same relationship to the stud web and legs as was explained in connection with Fig. 4, so that the legs of the stud effectively embrace the legs 55 and 56 of the lower stud support member.

In Figs. 4 and 6, as well as in Fig. 1, the mouth of each slot may be chamfered or tapered to facilitate reception of a stud end. The stud support member of Fig. 6 is easily cut to length by means of a shear, chisel or other cutting instrument, as will be evident.

In Fig. 8 is illustrated a lower stud socket member which may be considered a modified form of the Fig. 2 structure. Due to the fact that the various pockets or apertures that receive the lower end of a stud in Fig. 8, are identical in character and function to the apertures 37 of Fig. 2, those of Fig. 8 have been given the same reference character, namely 37. The device of Fig. 8 is essentially an inverted U-channel having a web 57 in which the series of apertures 37 are formed, and at opposite sides of the web are located the spaced parallel legs 58 and 59 which are adapted to rest upon a surface at the lower edge of a wall or partition. At intervals along the length of the stud socket element of Fig. 8, may be formed a series of seat parts or plates 60 formed integrally with the material of the strip, as shown. The simplicity with which the seat parts or plates 60 are formed is a matter of importance. This is accomplished merely by providing four notches at the locations 61, 62, 63, and 64, whereupon a pair of transverse portions 65 and 66 of the web may be depressed downwardly toward the free edges of the legs or flanges 58 and 59, leaving a spanning portion in the form of a plate or seat part 60 that may contact the floor or other surface supporting the stud socket member. It may be noted that the seat part or plate 60 preferably includes extensions projecting outwardly of the channel sides, said extensions being formed from material that would have ordinarily formed part of each leg 58 and 59, had not the plate or seat part been formed. The provision of the seats or plates greatly facilitates fastening of the stud support means firmly to a floor or other surface, as it is intentionally disposed in close proximity to the supporting surface. Each plate may be apertured as shown, to receive nails, screws or other fastening devices. The intervals at which the plates or seat parts are formed upon the stud support element, is a matter of choice or convenience.

The manner in which the lower end of a lath supporting upright or stud 9 cooperates with the apertures or sockets 37, is identically as disclosed and explained in connection with Figs. 1 and 2.

Fig. 9 discloses how the lower stud support device of Fig. 8 may be utilized in combination with structure including a pair of base-boards 67 and 68. It will be seen that the plate 60 may rest upon the transverse web or connecting portion 69 of the base-board element, so that an aperture 70 in the plate may register with an aperture 71 of part 69. Such disposition of the base-board structure relative to the stud supporting means results in a very rigid and strong wall or partition support, due especially to the fact that the base-boards and their connecting portion 69 are co-extensive in length with the length of the stud socket forming element. When the device of Fig. 8 is to be associated with a base-board element as explained with reference to Fig. 9, it may be of advantage to provide for disposition of the seat parts or plates 60 at a slight elevation above the lower edges of the legs 58 and 59, so that the lower edges of said legs may contact the floor or supporting surface even though the plate parts may be separated from the floor by the intervention of the thickness of base-board part 69. In the Fig. 9 combination, the lower ends of the studs 9 may rest upon the base-board connecting portion 69. This would not be true, however, if the base-boards were connected only at intervals, in the manner suggested by Fig. 3.

While the base-board structure of Fig. 9 includes the upright walls 67 and 68 formed integrally with the connecting base part 69, it should readily be understood that a built-up base-board structure of the type disclosed in Fig. 1, would be equally effective in combination with the lower stud socket member as illustrated in Fig. 9.

The various lower stud socket means disclosed herein may be used in cooperation with an overhead stud support of the character disclosed in Fig. 1, or in cooperation with any somewhat similar overhead support permitting an upward initial movement of the stud preceding the downward movement necessary for properly engaging the lower end of the stud with the socket means disclosed. In each instance, it is unnecessary to perform any special operation upon either end of the stud in order to adapt it for proper cooperation with its upper and lower end anchorages. It should accordingly be evident that any common channel iron studs as procured from the mill may be utilized in building a wall or partition, by merely cutting the stud to an approximate proper length, either at the mill or on the job. The invention herein disclosed greatly facilitates the work of wall or partition erection, and makes possible a saving of time and material, as well as reshipping and rehandling expenses as herein explained.

What is claimed is:

1. A wall or partition structure to be erected between the floor and ceiling of a room, which structure comprises a channel iron studding member having a pair of parallel legs and a connecting web, said studding member having opposed free ends at least one of which is of plain unaltered U-channel configuration, a floor socket for reception of one end of the studding member, and an overhead studding holder for the opposite end of the studding member, said holder comprising an elongated metallic strip bent lengthwise to a U-shaped channel configuration having depending legs and a connecting portion across the lower ends of said legs, said strip being slotted at intervals transversely to form head blocks of a depending character, the width of the slots approximating the thickness of the studding member web, and the distance between the legs of the overhead studding holder head blocks being slightly less than the distance between the legs of the studding member, and means on the holder for suspending it from the ceiling above the floor socket.

2. A wall or partition structure to be erected between the floor and ceiling of a room, which structure in skeletal form comprises a long channel iron studding member having opposed substantially parallel legs and a connecting web, and a lower and an upper end, a floor member including a socket elevated slightly above floor level to receive therein the lower end of the studding member, and an overhead studding holder for the upper end of the studding member, said holder comprising an elongated strip constituted of a series of spaced depending head blocks and means for fixing the strip relative to a ceiling, said blocks each being of a width slightly less than the width of the studding member web, and of a length greater than the elevation of the socket elevation above the floor level, whereby the studding member may be moved vertically to receive one of the blocks between the parallel legs of the studding and to dispose its lower end within or without the socket of the floor member.

3. A wall or partition structure to be erected between the floor and ceiling of a room, which structure in skeletal form comprises a long channel iron studding member having opposed substantially parallel legs and a connecting web, and a lower and upper end, a floor member including a socket elevated slightly above floor level to receive therein the lower end of the studding member, and an overhead studding holder for the upper end of the studding member, said holder comprising an elongated metallic strip bent lengthwise, and slotted transversely intermediate its side edges, to provide a pair of substantially horizontal mounting flanges attachable to a ceiling area and an intermediate U-shaped portion having spaced substantially parallel legs depending from the mounting flanges, said legs being divided by the transverse slots to form a row of depending head blocks, the slots each extending from the lower ends of the legs upwardly to a point sufficiently distant from the mounting flanges to retain the rigidity of the strip, the width of the slots being slightly greater than the thickness of the studding member web for reception thereof, and the width of the blocks being slightly less than the distance between the legs of the studding member, whereby the studding member with its web inserted in the slots will embrace and flatwise contact the opposed legs of the blocks.

4. A holder for an end of a wall stud of the channel iron type comprising a pair of substantially parallel spaced legs and a connecting web, said holder comprising an elongated metallic strip bent lengthwise, and slotted transversely intermediate its side edges, to provide a pair of substantially horizontal mounting flanges attachable to a ceiling area and an intermediate U-shaped portion having spaced substantially parallel legs depending from the mounting flanges, said legs being divided by the transverse slots to form a row of depending head blocks, the slots each extending from the lower ends of the legs upwardly to a point sufficiently distant from the mounting flanges to retain the rigidity of the strip, the width of the slots being slightly greater than the thickness of the studding member web for reception thereof, and the width of the blocks being slightly less than the distance between the legs of the studding member, whereby the studding member with its web inserted in the slots will embrace and flatwise contact the opposed legs of the blocks.

5. A holder for an end of a wall stud of the channel iron type comprising a pair of substantially parallel spaced legs and a connecting web, said holder comprising an elongated metallic strip bent lengthwise to a U-shaped channel configuration having depending legs and a connection portion across the lower ends of said legs, said strip being slotted at intervals transversely to form head blocks of a depending character, the width of the slots approximating the thickness of the studding member web, and the distance between the legs of the overhead studding holder head blocks approximating the distance between the legs of the studding member, and means on the holder for suspending it from a ceiling above the floor socket.

6. A holder for an end of a wall stud of the channel iron type comprising a pair of substantially parallel spaced legs and a connecting web, said holder comprising a longitudinal channel-shaped strip including opposed substantially parallel spaced legs and a connecting web, the width of said strip across and including its legs being slightly less than the distance between the spaced legs of the stud channel, and the legs and web of the strip being slotted or notched transversely providing a way of sufficient width to receive the web of the stud channel, whereby insertion of an end of the stud channel into said way disposes the legs of the stud channel in position to closely embrace the legs of the notched strip.

7. A holder for an end of a wall stud of the channel iron type comprising a pair of substantially parallel legs and a connecting web, said holder comprising an elongated metal strip having portions thereof bent upon itself to form a leg extending longitudinally of the strip and an elongated mounting flange extending along an edge of the leg, said leg at its edge remote from said mounting flange, being slotted or notched transversely of the length of the strip whereby to provide spaced members aligned lengthwise of the strip, each said aligned members including an angularly disposed portion, each of said last mentioned portions and its associated aligned member together forming a head block, opposite edges of said head blocks constituting abutment portions, the width of the blocks being slightly less than the distance between the spaced legs of the stud channel and the slots between the blocks providing ways of sufficient width to receive the web of the stud channel, whereby insertion of an end of the stud channel into the ways disposes the legs of the stud channel in close embracing relationship to the spaced abutment portions of the notched portions of the strip.

8. As a new article of manufacture, a stud holder comprising in combination, a pair of upright base-board elements spaced apart in substantial parallelism, and a stud socket member spanning said base-board elements at a location elevated above the lower edges thereof, said socket member being apertured to receive an end of a wall stud, and an incline and a stop at opposite sides of the aperture of the socket member, to guide the stud toward the aperture and to stop it in position to register with and enter said aperture.

9. As a new article of manufacture, a stud holder comprising a longitudinal inverted U-shaped channel comprising spaced legs and a connecting elevated web, the channel web being apertured at intervals along its ends to receive one end of a wall stud, and integral seat plates on the channel aligned in spaced relationship longitudinally of said holder and depressed to an elevation below the elevation of the web and into substantially the plane of the free edges of the channel legs, providing a nailing means to secure the holder to a surface.

10. As a new article of manufacture, a stud holder comprising a longitudinal inverted U-shaped channel comprising spaced legs and a connecting elevated web, the channel web being apertured at intervals along its ends to receive one end of a wall stud, and integral seat plates on the channel depressed to an elevation below the elevation of the web and into substantially the plane of the free edges of the channel legs, providing a nailing means to secure the holder to a surface, and a base-board element including upright spaced walls and a connecting portion spanning said walls, the distance between the walls being sufficiently wide to permit insertion of the holder body and the seat plates between the walls and upon the connecting portion of the base-board element.

11. A wall or partition structure to be erected between the floor and ceiling of a room, which structure comprises an elongated angle iron studding member having substantially parallel legs and a connecting web and adapted to have its opposite ends disposed adjacent the floor and ceiling of a room, a floor member comprising pocket forming means into which the lower end of the studding member may be introduced and from which it may be removed by way of a substantially vertical rectilinear movement longitudinally of the length of said studding member, and an overhead studding holder for the upper end of the studding member, said holder comprising an elongated strip constituted of a series of spaced depending head blocks and means for fixing the strip relative to the ceiling, said blocks being spaced at a distance slightly greater than the thickness of the studding member web, said blocks each having a transverse dimension slightly less than the spacing of the legs of the studding member, whereby the web of the angle iron studding member may enter the space between an adjacent pair of head blocks and the head blocks will be wholly disposed intermediate the planes of the parallel legs of the studding member.

WILLIAM M. GOLDSMITH.